(12) United States Patent
Porter et al.

(10) Patent No.: US 11,069,883 B2
(45) Date of Patent: Jul. 20, 2021

(54) GALVANIC METAL-WATER CELL WITH NICKEL-MOLYBDENUM CATHODE

(71) Applicant: L3 Open Water Power, Inc., Somerville, MA (US)

(72) Inventors: David Harvie Porter, Somerville, MA (US); Ian Salmon McKay, Seattle, WA (US); Thomas Bradford Milnes, Beverly, MA (US); Branko Zugic, Somerville, MA (US)

(73) Assignee: L3 Open Water Power, Inc., Somerville, MA (US)

( * ) Notice: Subject to any disclaimer, the term of this patent is extended or adjusted under 35 U.S.C. 154(b) by 103 days.

(21) Appl. No.: 16/307,218

(22) PCT Filed: Jul. 13, 2017

(86) PCT No.: PCT/US2017/041993
§ 371 (c)(1),
(2) Date: Dec. 5, 2018

(87) PCT Pub. No.: WO2018/013850
PCT Pub. Date: Jan. 18, 2018

(65) Prior Publication Data
US 2019/0296323 A1 Sep. 26, 2019

Related U.S. Application Data

(60) Provisional application No. 62/361,973, filed on Jul. 13, 2016.

(51) Int. Cl.
| | | |
|---|---|---|
| *H01M 4/04* | (2006.01) | |
| *H01M 4/38* | (2006.01) | |
| *H01M 6/06* | (2006.01) | |
| *C25D 3/56* | (2006.01) | |
| *C25D 5/50* | (2006.01) | |
| *C25D 5/18* | (2006.01) | |
| *H01M 4/02* | (2006.01) | |
| *C25D 5/14* | (2006.01) | |
| *C25D 5/12* | (2006.01) | |

(52) U.S. Cl.
CPC .......... *H01M 4/0452* (2013.01); *C25D 3/562* (2013.01); *C25D 5/18* (2013.01); *C25D 5/50* (2013.01); *H01M 4/38* (2013.01); *H01M 6/06* (2013.01); *C25D 5/12* (2013.01); *C25D 5/14* (2013.01); *H01M 2004/028* (2013.01); *H01M 2300/0014* (2013.01)

(58) Field of Classification Search
CPC ........ H01M 4/0452; H01M 4/38; H01M 6/06; H01M 2004/028; H01M 2300/0014; C25D 5/50; C25D 5/18; C25D 3/562; C25D 5/14; C25D 5/12

See application file for complete search history.

(56) References Cited

U.S. PATENT DOCUMENTS

| | | | | |
|---|---|---|---|---|
| 3,036,141 A | * | 5/1962 | Goldenberg | H01M 6/26 429/218.1 |
| 3,401,063 A | * | 9/1968 | Opitz | H01M 6/34 429/119 |
| 3,947,331 A | | 3/1976 | Kinh et al. | |
| 6,146,787 A | * | 11/2000 | Harrup | H01M 6/26 429/119 |
| 8,237,538 B2 | | 8/2012 | Braun et al. | |
| 2014/0154595 A1 | * | 6/2014 | McKay | H01M 12/08 429/410 |
| 2015/0233010 A1 | | 8/2015 | Pan | |
| 2016/0028089 A1 | | 1/2016 | Arpin | |

OTHER PUBLICATIONS

Krstajic et al; Electrodeposition of Ni—Mo alloy coatings and their characterization as cathodes for hydrogen evolution in sodium hydroxide solution, International Journal of Hydrogen Energy, vol. 33, issue 14, Jun. 4, 2008 (Jun. 4, 2008), p. 3676-3687.*
Crnkovic et al., "Electrochemical and morphological studies of electrodeposited Ni—Fe—Mo—Zn alloys tailored for water electrolysis", International Journal of Hydrogen Energy, vol. 29, issue 3, Sep. 17, 2003, p. 249-253.
Krstajic et al., "Electrodeposition of Ni—Mo alloy coatings and their characterization as cathodes for hydrogen evolution in sodium hydroxide solution", International Journal of Hydrogen Energy, vol. 33, issue 14, Jun. 4, 2008, p. 3676-3687.
Han et al., "A study on pulse plating amorphous Ni—Mo alloy coating used as HER cathode in alkaline medium", International Journal of Hydrogen Energy, vol. 35, issue 11, Apr. 22, 2010, p. 5194-5201.
McKone et al., "Evaluation of Pt, Ni, and Ni—Mo electrocatalysts for hydrogen evolution on crystalline Si electrodes", Energy and Environmental Science, vol. 4, Aug. 1, 2011, p. 3573-3583.
International search report for PCT/US2017/041993, dated Nov. 21, 2017, 3 pages.
Extended European search report for European Pat. Appl. No. 17828489.9, dated Mar. 12, 2020, 12 pages.
Alexsandrova G.S., et al., "Special Features of Nickel-Molybdenum Alloy Electrodeposition Onto Screen-Type Cathodes," Journal of Applied Chemistry of USSR, Consultants Bureau, New York, NY, US, vol. 54, No. 8 (Feb. 10, 1982) pp. 1604-1607.

* cited by examiner

*Primary Examiner* — Muhammad S Siddiquee
(74) *Attorney, Agent, or Firm* — Danielson Legal LLC

(57) ABSTRACT

Galvanic metal-water cells and methods of manufacturing positive electrodes to be used in said galvanic metal-water cells. The galvanic metal-water cells in accordance with various embodiments include a cathode that includes a layer comprising nickel-molybdenum deposited thereon. The nickel-molybdenum coated cathodes exhibit favorable hydrogen evolution reaction overpotential compared with existing devices. In these galvanic metal-water cells, the metal is oxidized and water is reduced.

20 Claims, 4 Drawing Sheets

GALVANIC METAL-WATER CELL WITH NICKEL-MOLYBDENUM CATHODE

CROSS REFERENCE TO RELATED APPLICATIONS

The present application is a national phase application of International (PCT) Patent Appl. No. PCT/US2017/041993, filed internationally on Jul. 13, 2017, and claims the benefit of and priority to U.S. Provisional Appl. No. 62/361,973, filed on Jul. 13, 2016, the entire disclosure of each of which is incorporated by reference as if set forth in their entirety herein.

TECHNICAL FIELD

This invention generally relates to galvanic metal-water power sources and methods of manufacturing galvanic metal-water power sources.

BACKGROUND

Power sources such as aluminum water cells have become a popular alternative energy source for underwater applications. These types of cells generally include a hydrogen evolving cathode that splits water according to the reaction $2H_2O \rightarrow H_2 + 2OH^-$. The hydroxide ions are then used to react with a metallic material such as aluminum.

It is desirable to develop and use cathodes that have a low hydrogen evolution reaction (HER) overpotential. HER overpotential refers to the additional voltage required to split water over the theoretical thermodynamic potential. It follows that a lower HER overpotential is desirable as devices with lower HER overpotential are more efficient.

Some existing cells use platinized titanium cathodes. However, platinized titanium has a high cost and requires unfavorable manufacturing processes for large scale production.

Another concern with existing cells that use seawater is the fouling that occurs by the natural metal ions in water. These may include, for example, silicon, iron, calcium, and magnesium.

A need exists, therefore, for methods and devices for that overcome the disadvantages of existing power sources.

SUMMARY

This summary is provided to introduce a selection of concepts in a simplified form that are further described below in the Detailed Description section. This summary is not intended to identify or exclude key features or essential features of the claimed subject matter, nor is it intended to be used as an aid in determining the scope of the claimed subject matter.

According to one aspect, embodiments relate to a method of manufacturing a positive electrode for a galvanic metal-water cell. The method includes providing an electrodeposition solution; placing a substrate in the electrodeposition solution; and depositing a layer comprising nickel-molybdenum on the substrate to provide a nickel-molybdenum coated positive electrode for a galvanic metal-water cell.

In some embodiments, the method further includes providing a sacrificial material on the substrate. In some embodiments, the sacrificial material is selected from the group consisting of zinc, copper, nickel, and aluminum. In some embodiments, the sacrificial material is co-deposited on the substrate simultaneously with the nickel-molybdenum layer. In some embodiments, the method further includes leaching the sacrificial material by at least one of corrosion and an applied potential. In some embodiments, depositing the layer comprising nickel-molybdenum includes electrodepositing the nickel-molybdenum layer on the substrate after the sacrificial material is at least partially removed.

In some embodiments, the method further includes annealing the nickel-molybdenum coated positive electrode at a temperature up to 1,200 degrees Celsius in a controlled gas atmosphere.

In some embodiments, the electrodeposition solution is an aqueous solution that includes a nickel salt, a molybdenum salt, a complexing agent, and additional salts selected from the group consisting of sodium chloride, sodium carbonate, sodium bicarbonate, ammonium hydroxide, and sodium hydroxide. In some embodiments, the complexing agent is selected from the group consisting of potassium pyrophosphate, potassium citrate, and ammonium chloride. In some embodiments, the molybdenum salt is sodium molybdate.

In some embodiments, the nickel-molybdenum layer is deposited on the substrate using electrodeposition with a variable current density in the range of 5 and 800 mA per cm^2.

In some embodiments, depositing the nickel-molybdenum layer comprises electrodepositing the layer on the substrate through alternating periods of reduction and no reduction.

According to another aspect, embodiments relate to a galvanic metal-water cell. The galvanic metal-water cell includes an anode and a cathode including a nickel-molybdenum coating.

In some embodiments, the cell further includes a water-based electrolyte. In some embodiments, the water-based electrolyte is selected from the group consisting of a seawater-based electrolyte, a fresh water-based electrolyte, and a brackish water-based electrolyte.

In some embodiments, the cell further includes a non-aqueous electrolyte.

In some embodiments, the cell is a dry battery cell.

In some embodiments, the cell further includes an electrolyte containing a salt with the hydroxide anion.

In some embodiments, the anode is a metal anode that undergoes oxidation and water is reduced at the cathode. In some embodiments, the metal of the anode is selected from the group consisting of lithium, aluminum, and magnesium.

BRIEF DESCRIPTION OF DRAWINGS

Non-limiting and non-exhaustive embodiments of the invention are described with reference to the following figures, wherein like reference numerals refer to like parts throughout the various views unless otherwise specified.

DETAILED DESCRIPTION

Various embodiments are described more fully below with reference to the accompanying drawings, which form a part hereof, and which show specific exemplary embodiments. However, the concepts of the present disclosure may be implemented in many different forms and should not be construed as limited to the embodiments set forth herein; rather, these embodiments are provided as part of a thorough and complete disclosure, to fully convey the scope of the concepts, techniques and implementations of the present disclosure to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Reference in the specification to "one embodiment" or to "an embodiment" means that a particular feature, structure, or characteristic described in connection with the embodiments is included in at least one example implementation or technique in accordance with the present disclosure. The appearances of the phrase "in one embodiment" in various places in the specification are not necessarily all referring to the same embodiment.

In addition, the language used in the specification has been principally selected for readability and instructional purposes and may not have been selected to delineate or circumscribe the disclosed subject matter. Accordingly, the present disclosure is intended to be illustrative, and not limiting, of the scope of the concepts discussed herein.

Features of various embodiments described herein are directed towards galvanic metal-water cells with one or more nickel-molybdenum coated electrodes as well as methods of manufacturing said electrodes. Nickel-molybdenum coated electrodes are an improvement over existing electrodes (e.g., platinized titanium-based electrodes) as they exhibit a lower HER overpotential for a given current density normalized by geometric surface area and have lower manufacturing costs.

It should be noted that the exact cell chemistry of an aluminum-water battery/fuel cell is not described herein. However, the cell chemistry and examples of such cells can be seen in U.S. Pat. Appl. Publ. No. 2014/0154595, the contents of which are hereby incorporated by reference as if set forth in its entirety herein.

Figure 1:
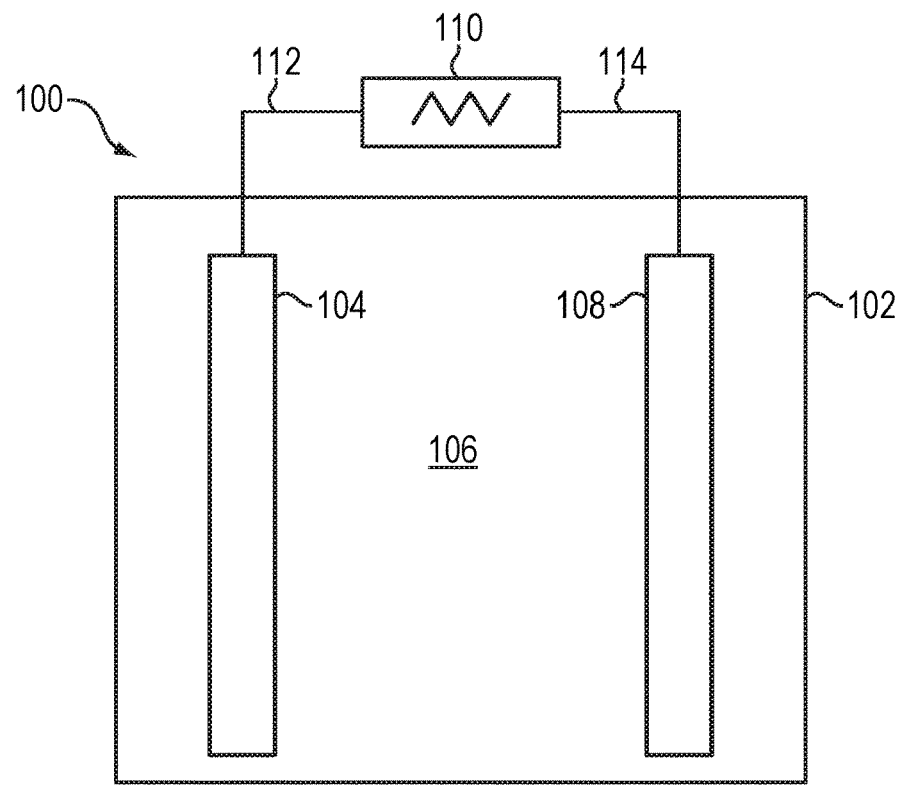
FIG. 1 illustrates a galvanic metal-water cell in accordance with one embodiment.

FIG. 1 illustrates a galvanic metal-water cell 100 in accordance with one embodiment. The galvanic metal-water cell 100 may include a housing 102, electrode 104, an electrolyte 106, and an electrode 108. In some embodiments electrode 104 may be an anode and electrode 108 may be a cathode (i.e., positive) electrode. A load 110 may be connected to the electrodes 102 and 104 via leads 112 and 114.

The anode electrode 104 may be formed of aluminum or an aluminum alloy. Additionally or alternatively, the anode electrode 104 may include a metal such as lithium or magnesium. In the galvanic metal-water cells of various embodiments, the metal anode 104 is oxidized and water is reduced.

The electrolyte 106 may be a water-based electrolyte. In the context of the present application, the term "water-based electrolyte" may refer to an electrolyte that includes seawater, brackish water, or freshwater.

The positive electrode (i.e., the cathode) 108 may be configured as a thin plate of any suitable substrate with a layer comprising nickel-molybdenum deposited thereon. The substrates used may be configured as plates, foils, mesh, or some type of metal foam. In some embodiments, the substrate may be any type of conductive material including, but not limited to, nickel foam, stainless steel mesh, and nickel plate.

The thickness of the substrate may of course vary as long as the features of various embodiments described herein may be accomplished. The thickness may vary depending on, for example, the power density requirements of the galvanic metal-water cell 100.

Figure 2:
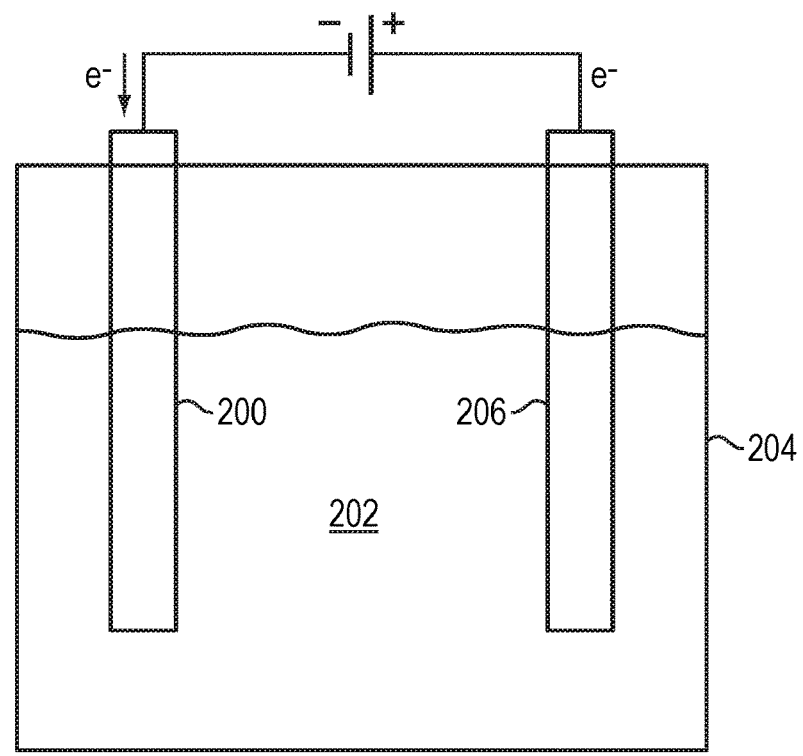
FIG. 2 illustrates an electrolytic vessel in which the electrodeposition of a nickel-molybdenum layer on a substrate to form the nickel-molybdenum coated positive electrode of FIG. 1 occurs in accordance with one embodiment.

As mentioned above, the substrate may be coated with a layer comprising nickel-molybdenum. The nickel-molybdenum (NiMo) coating may be deposited on the substrate in an electrolytic vessel through electrodeposition from a solution that includes a complexing agent. FIG. 2, for example, illustrates a substrate 200 placed in an electrodeposition solution 202 in an electrolytic vessel 204. The vessel 204 also includes an anode 206.

The electrodeposition process may be carried out using the solution 202 that contains a complexing agent that drives the co-deposition of nickel and molybdenum. In some embodiments, the complexing agent may include potassium citrate, potassium pyrophosphate, or ammonium chloride. The co-deposition processes using these complexing agents may occur at temperatures in the range of 10° C. to 90° C. and with a pH of 6 to 11.

The electrodeposition coating process may also be varied by changing the plating solution composition and/or the plating current. The plating current may be varied between, for example, 5 and 800 mA per cm^2 of electrical surface area as measured by double layer capacitance cyclic voltammetry.

In addition to varying the current density, the codeposition process may be varied by using a pulse plating technique. "Pulse plating" may refer to a codeposition process that alternates between periods of reduction and rest. In some embodiments, for example, these pulses may involve 1-30 seconds of reduction, followed by 1-90 seconds of rest.

Figure 3:
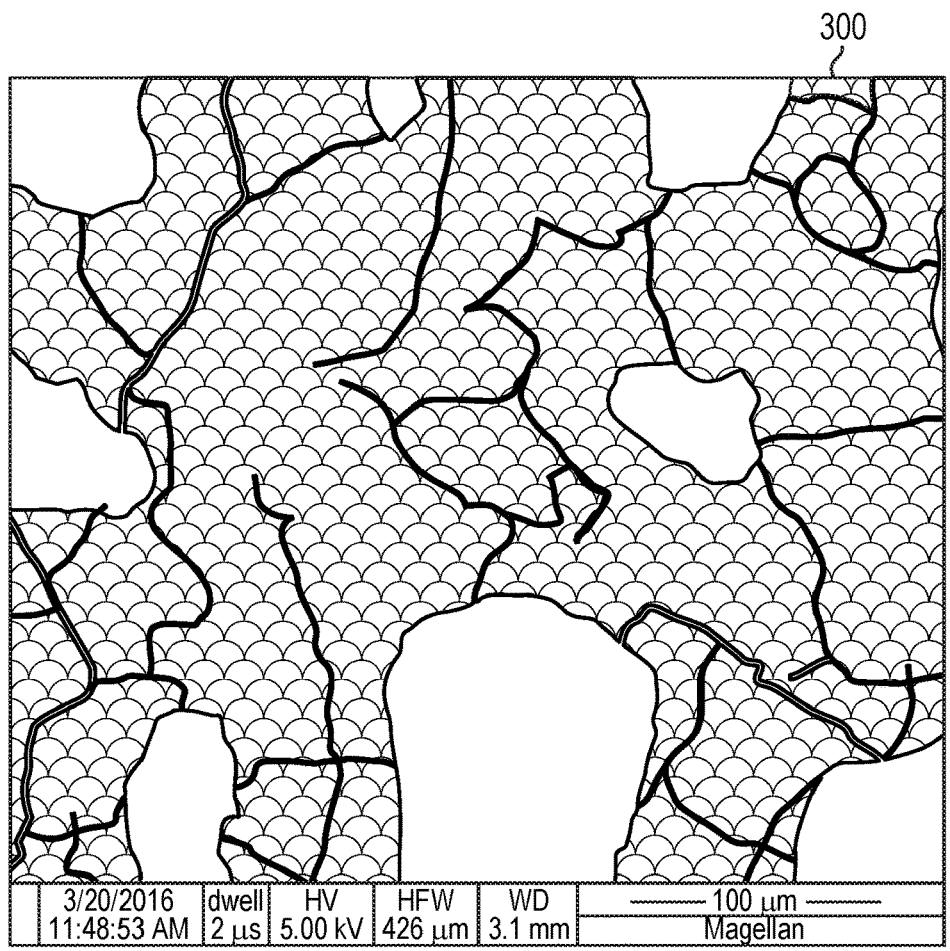
FIG. 3 is a micrograph of a uniform nickel-molybdenum coating in accordance with one embodiment.

Pulse plating allows the plating ions to enter the pores of a porous media on the nickel-molybdenum coated substrate and results in a more uniform coating. FIG. 3, for example, shows a micrograph 300 of a uniform NiMo coating obtained using a scanning electron microscope. Specifically, micrograph 300 shows the uniform NiMo coating in foam pores after pulse plating. The pulses may repeat until the desired coating has been achieved.

It is noted that the molybdenum may re-oxidize during the rest periods associated with pulse plating. Accordingly, the term "rest" in the context of the pulse plating technique described herein may refer to scenarios in which there is no applied potential or simply enough applied potential to stop re-oxidation.

The substrate and/or the nickel-molybdenum coating may include a sacrificial component that increases the surface area of the substrate 200 or coating, respectively. The sacrificial component may include metal components such as Zn, Cu, and Al.

The sacrificial component may be applied in a number of ways. In one embodiment, the sacrificial component may be co-deposited simultaneously with the nickel and molybdenum. The sacrificial material may then be leached out by free corrosion in the solution or by an applied potential in the solution.

In other embodiments, the surface area of the substrate 200 can be increased by first depositing the sacrificial component with a metal or metals that are similar to that of the substrate. The sacrificial metal may then be removed, and then the nickel-molybdenum coating may be electroplated on the substrate with the increased surface area.

Other embodiments may increase the coated surface area by, for example, using sacrificial templates based on nanostructured plastics, polymers, or deposits. These deposits may be based on chemical vapor deposition and/or physical vapor deposition techniques.

The nickel-molybdenum coated substrates of various embodiments may be annealed in a controlled gas atmosphere to improve adhesion and to promote alloying at the substrate surface. This includes substrates with the nickel-molybdenum coatings, substrates with the sacrificial coatings, and substrates with enhanced coated surface area. These substrates may be annealed in a furnace in a controlled gas atmosphere at temperatures up to 1,200°. The controlled gas atmospheres may include, but are not limited to, gases such as air, nitrogen, argon, hydrogen, carbon, monoxide, and methane.

Once coated with nickel-molybdenum, the positive electrode may be used in a galvanic metal-water cell such as the cell 100 of FIG. 1. For example, the substrate 200 of FIG. 2 (which has been coated with nickel-molybdenum) can be removed from the vessel 204 and placed in a galvanic metal-water cell to function as a cathode. Or, the solution 202 of FIG. 2 may be drained from the vessel 204, which may then be used as the galvanic metal-water cell.

The nickel-molybdenum coated positive electrode may then be used as a direct replacement for a standard Pt/Ti cathode or any other type of hydrogen-evolving electrode. Additionally, because many of the potential substrates are porous, multiple sheets may be layered to yield a higher cathode surface area and therefore higher HER activity at a given overpotential.

Figure 4:
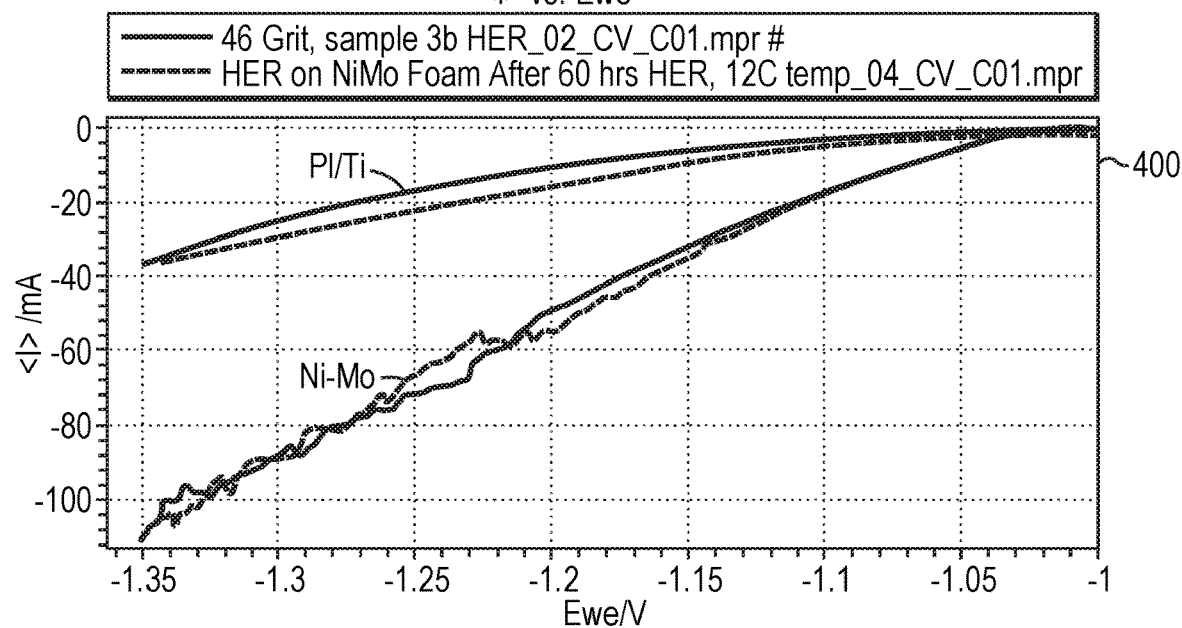
FIG. 4 presents a graph showing the performance of a nickel-molybdenum coated cathode compared to a platinized titanium cathode in accordance with one embodiment.

FIG. 4 illustrates a graph 400 showing the improvement of nickel-molybdenum (NiMo) coated cathodes over the industry standard platinized titanium (Pt/Ti) cathodes. Specifically, graph 400 shows the hydrogen evolution reaction of each sample. In this experiment, the reference electrode was a silver chloride electrode. As can be seen, the overpotential for the hydrogen evolution reaction for Ni—Mo is lower than that for Pt/Ti. Additionally, and as mentioned previously, Ni—Mo coated cathodes are significantly less expensive to create than Pt/Ti cathodes.

This coating maintains better HER performance than other directly deposited layers on a cathode surface, such as those that include Sn, Fe, Ca, or Mg. In addition to or in lieu of a salt including molybdate, salts including any one of hydroxide, lithium, sodium, potassium, rubidium, cesium, and/or francium may be used as well.

The galvanic metal-water cell 100 with the nickel-molybdenum electrode 108 may be implemented in a number of ways. The cell 100 may be a dry battery cell system, for example. Or, as mentioned previously, the electrolyte (e.g., 1M KOH) may also include seawater, brackish water, or freshwater. Alternatively, the electrolyte 106 may be a non-aqueous electrolyte. In some embodiments, the electrolyte 106 may contain a salt with the hydroxide anion.

Figure 5:
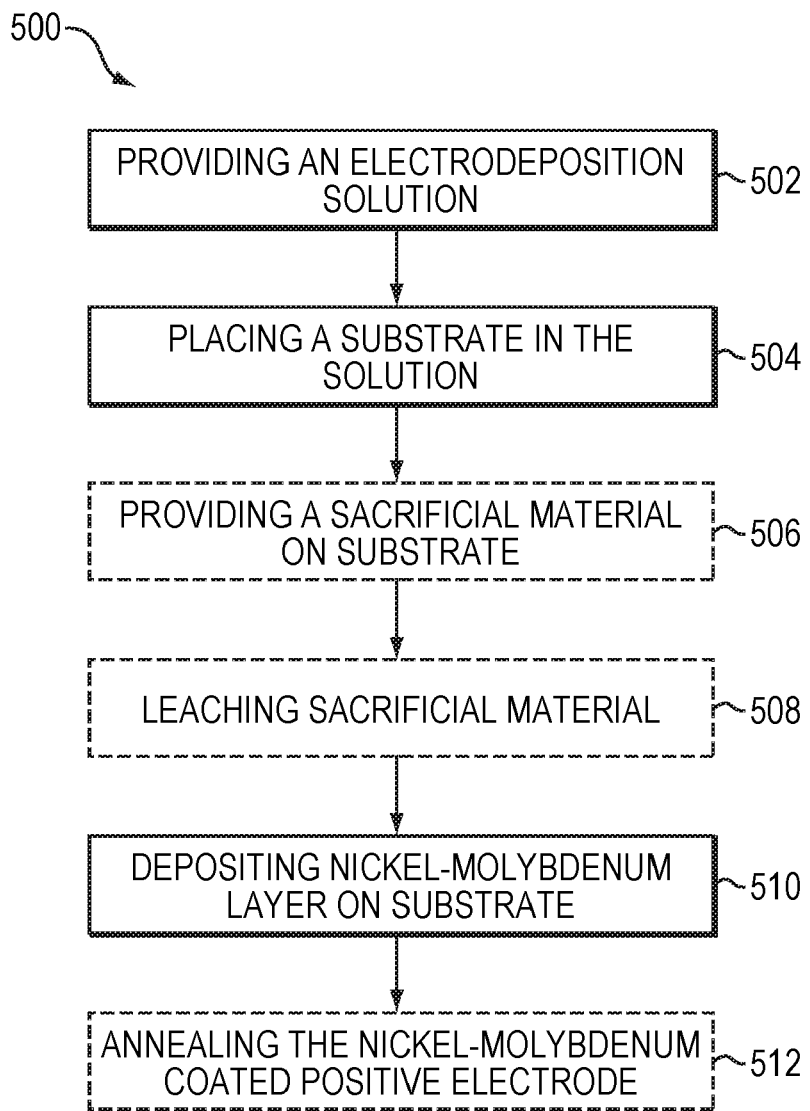
FIG. 5 depicts a flowchart of a method of manufacturing a positive electrode for a galvanic metal-water cell in accordance with one embodiment.

FIG. 5 depicts a flowchart of a method 500 of manufacturing a positive electrode for a galvanic metal-water cell in accordance with one embodiment. Step 502 involves providing an electrodeposition solution. This solution may be similar to the solution 202 of FIG. 2 and may include a nickel salt such as nickel chloride or nickel sulfate, a molybdenum salt such as sodium molybdate, and a complexing agent that drives the co-deposition of nickel and molybdenum. The complexing agent may include, for example, potassium pyrophosphate, potassium citrate, and ammonium chloride.

The electrodeposition solution may also include additional salts. These additional, optional salts may include sodium chloride, sodium carbonate, sodium bicarbonate, ammonium hydroxide, and sodium hydroxide.

Step 504 involves placing a substrate in the electrodeposition solution. The substrate may be similar to the substrate 200 of FIG. 2. The substrate may be any conductive material including, but not limited to, nickel foam, stainless steel mesh, and nickel plate.

Step 506 involves the optional step of providing a sacrificial material on the substrate. In some embodiments, the sacrificial material is selected from the group consisting of zinc, copper, nickel, and aluminum. The sacrificial material may be co-deposited on the substrate simultaneously with the nickel-molybdenum layer or deposited on the substrate before the nickel-molybdenum layer.

Step 508 involves the optional step of leaching the sacrificial material from the substrate to increase the available surface area (when a sacrificial material is used). Step 510 then involves depositing the layer comprising nickel-molybdenum on the substrate to provide a nickel-molybdenum coated positive electrode to be used as a cathode in a galvanic metal-water cell. When a sacrificial material is used, the nickel-molybdenum may be deposited on the substrate by electrodepositing the nickel-molybdenum layer on the substrate after the sacrificial material is at least partially removed. As mentioned previously, the electrodeposition process may involve alternating periods of reduction and rest. Also, the current density for the electrodeposition process may vary in the range of 5 and 800 mA per $cm^2$.

Step 512 involves optionally annealing the nickel-molybdenum coated positive electrode. This annealing step may occur at temperatures up to and including 1,200 degrees Celsius and may improve adhesion and promote alloying at the surface of the substrate.

The nickel-molybdenum coated cathode may be placed in a galvanic metal-water cell that may include a water-based electrolyte. The water-based electrolyte may include seawater, fresh water, and/or brackish water. The galvanic metal-water cells may include metal anodes such as lithium, aluminum, and magnesium that are oxidized and water that is reduced at the cathode.

Figure 6:
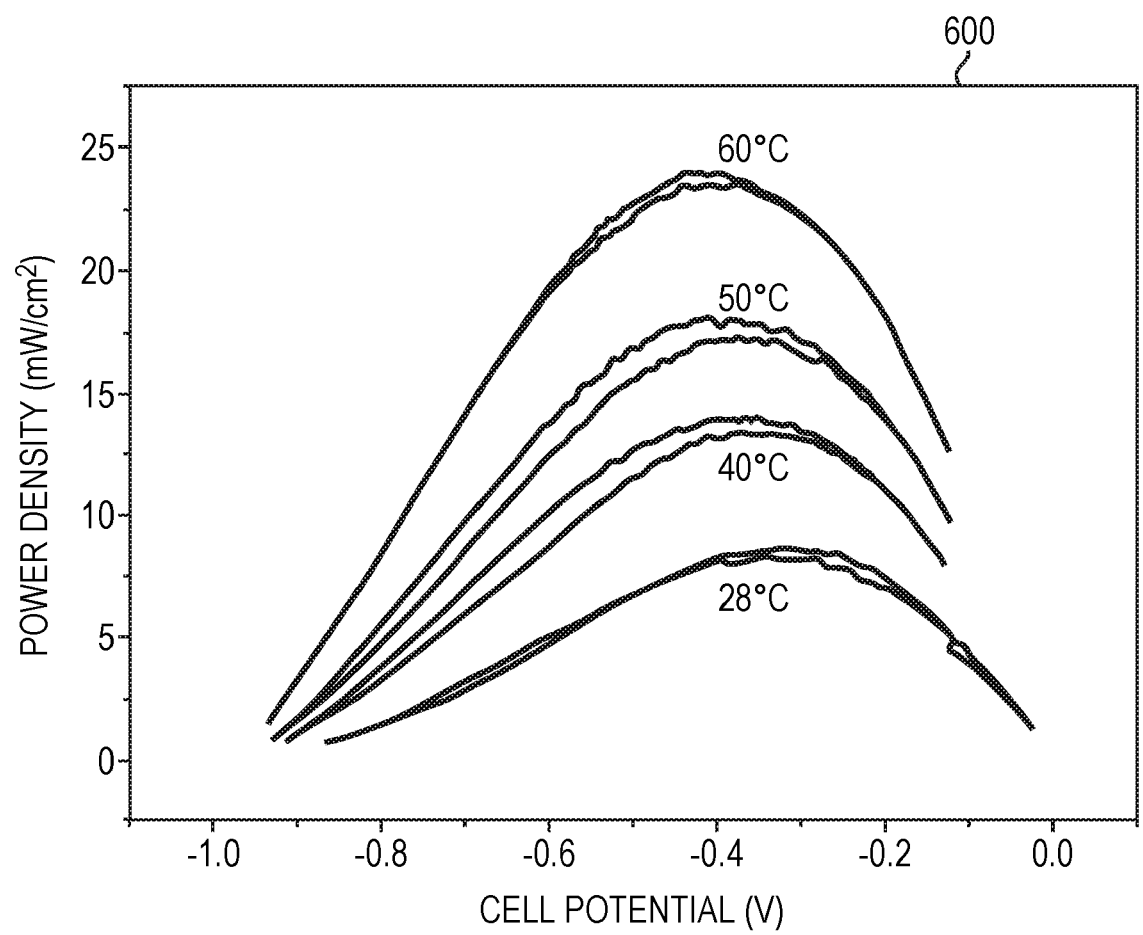
FIG. 6 presents a graph showing the performance of an aluminum-water cell using a nickel-molybdenum coated cathode at various temperatures in accordance with one embodiment.

FIG. 6 illustrates a graph 600 of the performance of an aluminum-water cell such as the cell 100 at various temperatures. These results were obtained by operating the aluminum-water cell with a Ni—Mo coated cathode at various temperatures using 1M KOH electrolyte.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Embodiments of the present disclosure, for example, are described above with reference to block diagrams and/or operational illustrations of methods, systems, and computer program products according to embodiments of the present disclosure. The functions/acts noted in the blocks may occur out of the order as shown in any flowchart. For example, two blocks shown in succession may in fact be executed substantially concurrent or the blocks may sometimes be executed in the reverse order, depending upon the functionality/acts involved. Additionally, or alternatively, not all of the blocks shown in any flowchart need to be performed and/or executed. For example, if a given flowchart has five blocks containing functions/acts, it may be the case that only three of the five blocks are performed and/or executed. In this example, any of the three of the five blocks may be performed and/or executed.

A statement that a value exceeds (or is more than) a first threshold value is equivalent to a statement that the value meets or exceeds a second threshold value that is slightly greater than the first threshold value, e.g., the second threshold value being one value higher than the first threshold value in the resolution of a relevant system. A statement that a value is less than (or is within) a first threshold value is equivalent to a statement that the value is less than or equal to a second threshold value that is slightly lower than the first threshold value, e.g., the second threshold value being one value lower than the first threshold value in the resolution of the relevant system.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of various implementations or techniques of the present disclosure. Also, a number of steps may be undertaken before, during, or after the above elements are considered.

Having been provided with the description and illustration of the present application, one skilled in the art may envision variations, modifications, and alternate embodiments falling within the general inventive concept discussed in this application that do not depart from the scope of the following claims.

What is claimed is:

1. A galvanic metal-water cell, the galvanic-metal water cell comprising:
    an anode;
    a cathode, wherein:
        the cathode is a substrate having pores with a diameter under 500 microns;
        the cathode comprises nickel, and
        the cathode has a nickel-molybdenum coating.

2. The metal-water cell of claim 1, further comprising a water-based electrolyte.

3. The metal-water cell of claim 2 wherein the water-based electrolyte is selected from the group consisting of a seawater-based electrolyte, a fresh water-based electrolyte, and a brackish water-based electrolyte.

4. The metal-water cell of claim 1 wherein the pores have a diameter of under 426 microns.

5. The metal-water cell of claim 1 wherein the cathode comprises at least two layers of the porous substrate comprising nickel.

6. The metal-water cell of claim 1 further comprising an electrolyte containing a salt with the hydroxide anion.

7. The metal-water cell of claim 1 wherein the anode is a metal anode that undergoes oxidation and water is reduced at the cathode.

8. The metal-water cell of claim 7 wherein the metal of the anode is selected from the group consisting of lithium, aluminum, and magnesium.

9. A method of manufacturing a positive electrode for a galvanic metal-water cell, the method comprising:
    providing an electrodeposition solution;
    placing a substrate having pores with a diameter under 500 microns in the electrodeposition solution, the substrate comprising nickel; and
    depositing a layer comprising nickel-molybdenum on the substrate to provide a nickel-molybdenum coated positive electrode for a galvanic metal-water cell.

10. The method of claim 9 further comprising providing a sacrificial material on the porous substrate.

11. The method of claim 10 wherein the sacrificial material is selected from the group consisting of zinc, copper, nickel, and aluminum.

12. The method of claim 10, wherein the sacrificial material is co-deposited on the porous substrate with the nickel-molybdenum layer.

13. The method of claim 12, further comprising leaching the sacrificial material by at least one of corrosion and an applied potential.

14. The method of claim 10, wherein depositing the layer comprising nickel-molybdenum includes electrodepositing the nickel-molybdenum layer on the porous substrate after the sacrificial material is at least partially removed.

15. The method of claim 9 further comprising annealing the nickel-molybdenum coated positive electrode at a temperature up to 1,200 degrees Celsius in a controlled gas atmosphere.

16. The method of claim 9 wherein the electrodeposition solution is an aqueous solution that includes a nickel salt, a molybdenum salt, a complexing agent, and additional salts selected from the group consisting of sodium chloride, sodium carbonate, sodium bicarbonate, ammonium hydroxide, and sodium hydroxide.

17. The method of claim 16 wherein the complexing agent is selected from the group consisting of potassium pyrophosphate, potassium citrate, and ammonium chloride.

18. The method of claim 16, wherein the molybdenum salt is sodium molybdate.

19. The method of claim 9 wherein the nickel-molybdenum layer is deposited on the porous substrate using electrodeposition with a variable current density in the range of 5 and 800 mA per cm^2.

20. The method of claim 9, wherein depositing the nickel-molybdenum layer comprises electrodepositing the layer on the porous substrate through alternating periods of reduction and no reduction.

* * * * *